United States Patent [19]

Miyazoe et al.

[11] Patent Number: 5,706,858
[45] Date of Patent: Jan. 13, 1998

[54] SOLENOID VALVE ASSEMBLY CONNECTOR FASTENERS

[75] Inventors: Shinji Miyazoe; Bunya Hayashi; Makoto Ishikawa, all of Yawara-mura, Japan

[73] Assignee: SMC Corporation, Tokyo, Japan

[21] Appl. No.: 739,289

[22] Filed: Oct. 29, 1996

[30] Foreign Application Priority Data

Nov. 6, 1995 [JP] Japan .................................. 7-311533

[51] Int. Cl.⁶ .................................................. F16K 11/00
[52] U.S. Cl. .................................. 137/884; 137/270
[58] Field of Search .................................. 137/884, 270

[56] References Cited

FOREIGN PATENT DOCUMENTS

| 0163579 | 1/1990 | Japan | 137/884 |
|---|---|---|---|
| 4 77073 | 7/1992 | Japan | |

*Primary Examiner*—John Fox
*Attorney, Agent, or Firm*—Oblon, Spivak, McClelland, Maier & Neustadt, P.C.

[57] ABSTRACT

A device to fasten a power supply connector unit 18 to a solenoid valve assembly 1 comprising multiple solenoid valves 2. The fastening device has a side plate 4 having a vertical first fitting surface 21a and a horizontal second fitting surface 21b, two pairs of positioning recesses 22a and 22b and two pairs of engaging recesses 23a and 23b on the two fitting surfaces, two each projections 29 and hooks 30 on the connector unit 18, and an opening 20 to pass lead wires extending over the two fitting surfaces.

6 Claims, 4 Drawing Sheets

SOLENOID VALVE ASSEMBLY CONNECTOR FASTENERS

TECHNICAL FIELD OF THE INVENTION

This invention relates to fasteners for attaching power-supply connectors leading to each solenoid valve to an assembly of solenoid valves.

PRIOR ART

Power supply to the solenoid valves that make up a solenoid valve assembly is usually made concentrically through a multipolar connector having multiple connecting pins.

The connector is attached to a side plate or other component positioned at an end of the solenoid valve assembly, with the connecting pins connected to the individual solenoid valves, while power supply is made by connecting a socket connected to a power supply or a power controller to said connector.

However, it is sometimes difficult to connect an external socket to the connector attached to the solenoid valve assembly, depending on the place or position of installation.

To overcome such difficulty, for example, Japanese Provisional Utility Model Publication No. 77073 of 1992 proposed a fastener that can selectively attach a connector to a solenoid valve assembly in an upright or a horizontal position.

However, the improved connector fastener described above has two connecting recesses to permit the selective fitting of the connector in different directions. Thus, the improved faster has more elements and is more complex than conventional ones. The connector is fastened to one of the two parts using a screw, whereas the mating end of unused connecting element must be closed with a cover when the connector is fastened to the other connecting element. Therefore, considerable time has been required for the connection and disconnection of the connector for changing its direction.

SUMMARY OF THE INVENTION

An object of the invention is to provide a fastener that permits attaching a connector unit to a side plate incorporated in a solenoid valve assembly in either of an upright or a horizontal position.

Another object of the invention is to provide simple means for surely fastening the connector unit to the side plate without using any screw.

Still another object of the invention is to provide means for accurately fastening the connector unit to the desired point of the side plate.

Yet another object of the invention is to provide a fastener of rational and efficient design that leaves no space to cover on the side plate irrespective of the direction in which the connector unit is attached.

A further object of this invention is to provide a fastener that permits attaching common commercially available connectors in the desired direction.

In order to achieve the above objects, a fastener according to this invention comprises a side plate disposed at one end of a solenoid valve assembly having a first vertical face to permit the fastening of a connector unit, a second face horizontally extending from the first vertical face that also permits the fastening of a connector unit, and an opening extending over said two faces for passing a lead wire, and at least one engaging element to fasten the connector unit formed on each of the two faces, and the connector unit having at least one hook to permit selective and elastic engagement with the engaging element on the two faces of the side plate, whereby the connector unit can be selectively fastened either in an upright or a horizontal position by selective engagement with the engaging element.

In a preferred embodiment of this invention, at least one positioning part to determine the fastening position of the connector unit is provided on each of the two faces and the connector unit has at least one projection to engage with the positioning part.

In another preferred embodiment of this invention, the connector unit has a first connector leading to each solenoid valve and a holder to hold the first connector, with the hook or the hook and projection formed on the holder.

In still another preferred embodiment of this invention, two each positioning parts and engaging recesses are symmetrically provided on each of the two faces of the side plate, whereas two each projections and hooks are symmetrically provided on the connector unit.

It is preferable that the connector has a first connector that leads to each solenoid valve and a holder to hold the first connector, with two projections and hooks provided on the holder.

In another embodiment of this invention, the holder is shaped like a long box whose top and side are openable, with the first connector attached to the top, the lead wires from the individual solenoid valves connected to the first connector through the openable side, two projections formed at the bottom of the holder, and the hook provided on the elastic part leading to the faces at both ends of the length of the holder.

DETAILED DESCRIPTION

Figure 1:
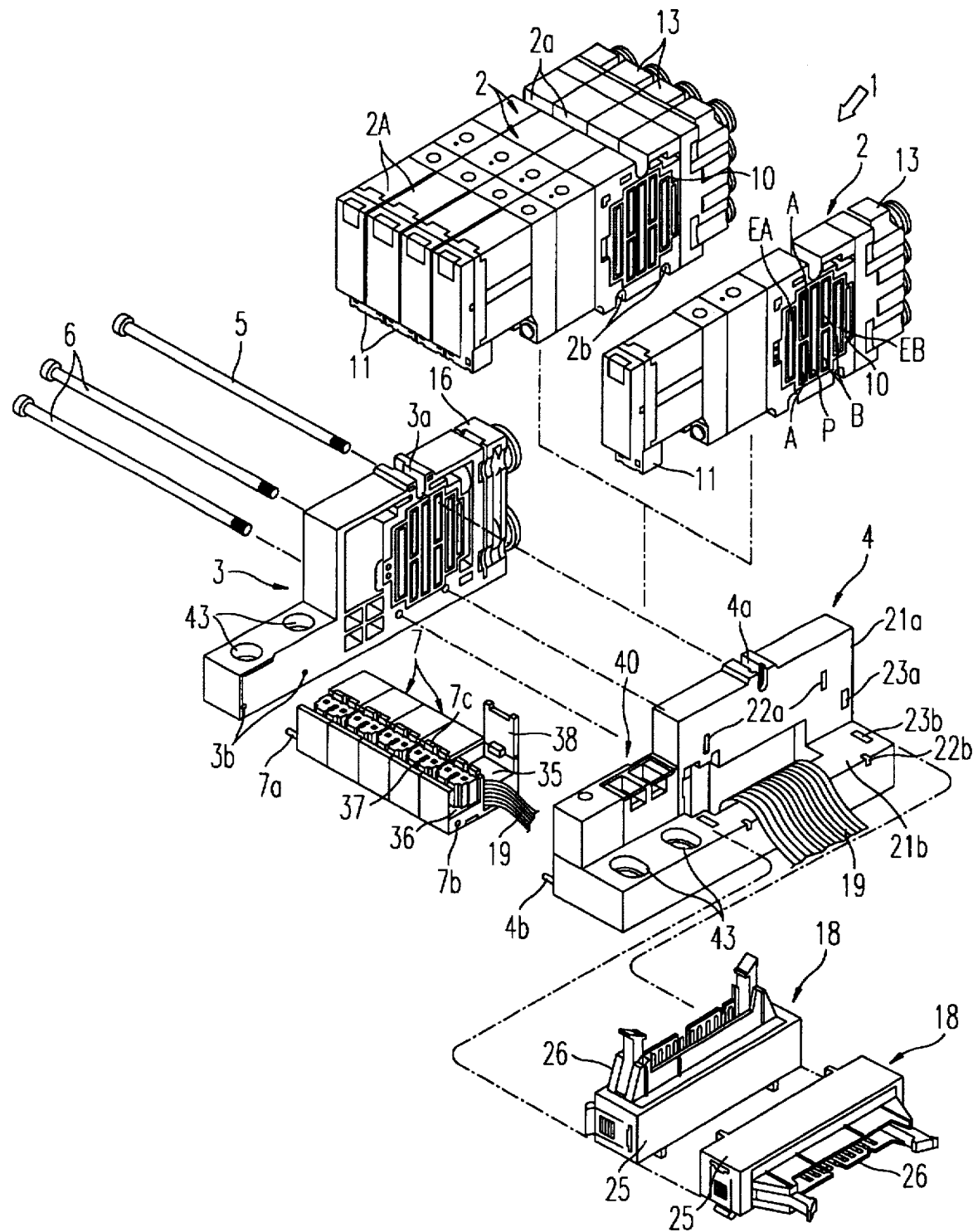
FIG. 1 is an exploded perspective view of a first embodiment of this invention.

FIGS. 1 to 7 show a first embodiment of a solenoid valve assembly according to this invention. A solenoid valve assembly 1 comprises multiple solenoid valves 2 joined together breadthwise (five solenoid valves are assembled in the illustrated embodiment), a first side plate 3 and a second side plate 4 on both sides of the assembled solenoid valves that are integrally joined together by means of fastening bolts 6 at the top and bottom. A housing 7 to cover the electric connection of a solenoid 2A is attached to the bottom of each solenoid valve 2.

Figure 2:
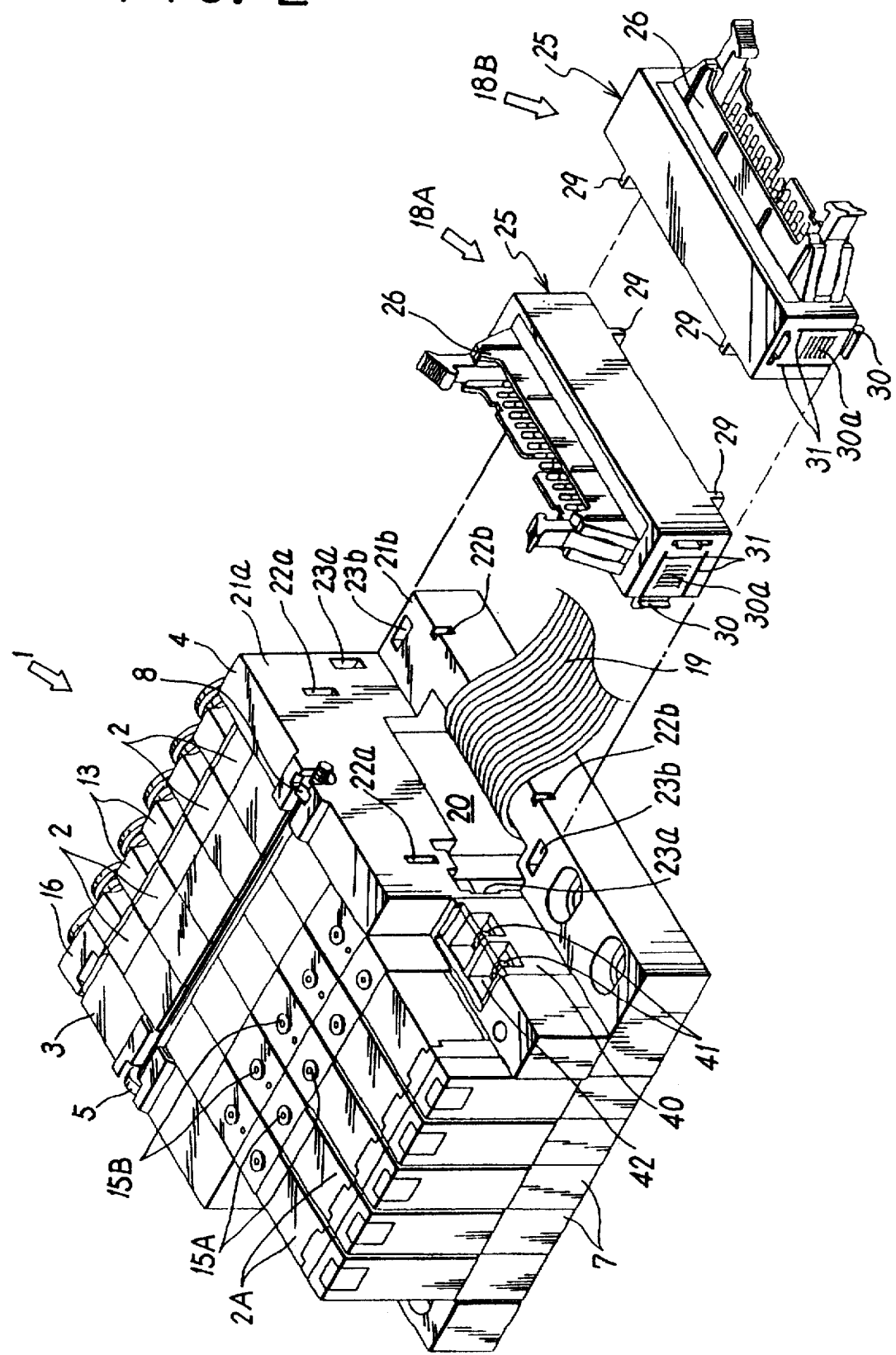
FIG. 2 is a perspective view of the same embodiment, with the connector unit detached.
Figure 3:
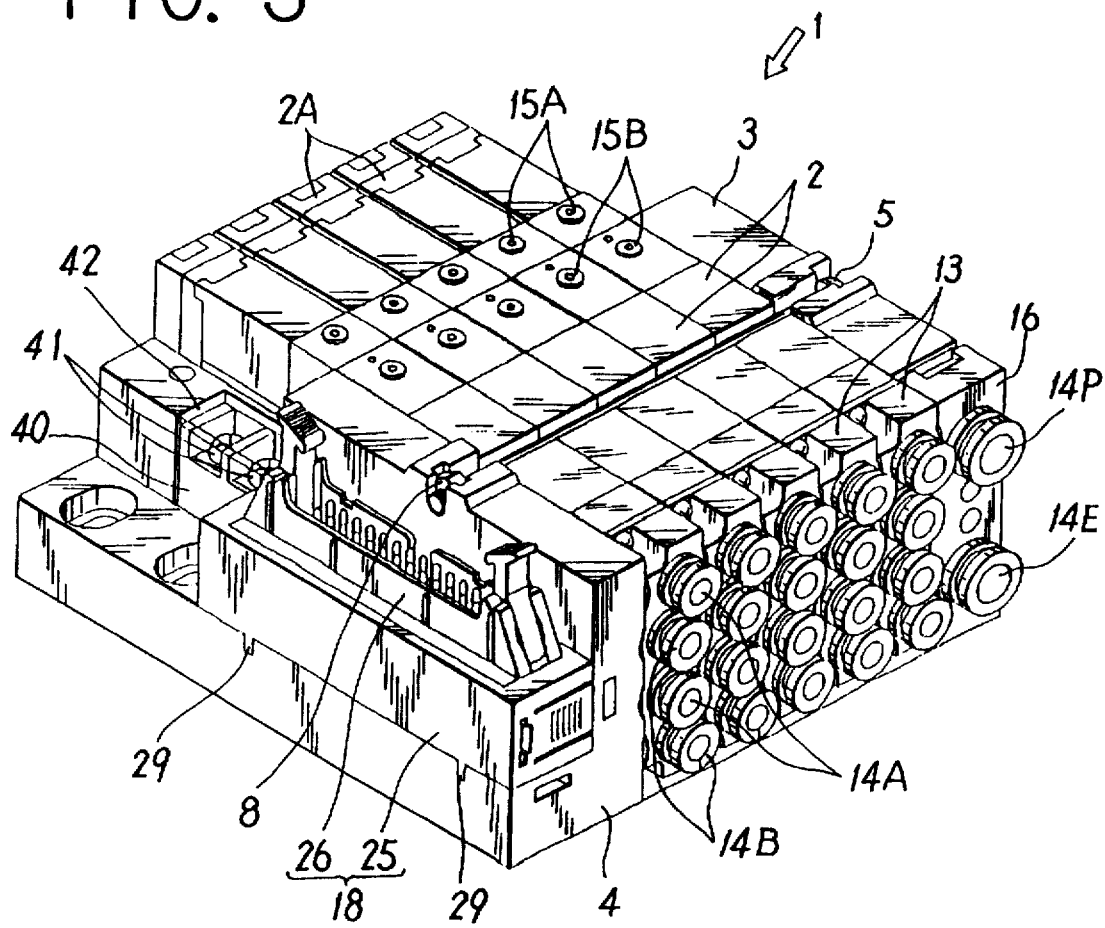
FIG. 3 is a perspective view of the same embodiment, with the connector unit attached in an upright position.
Figure 4:
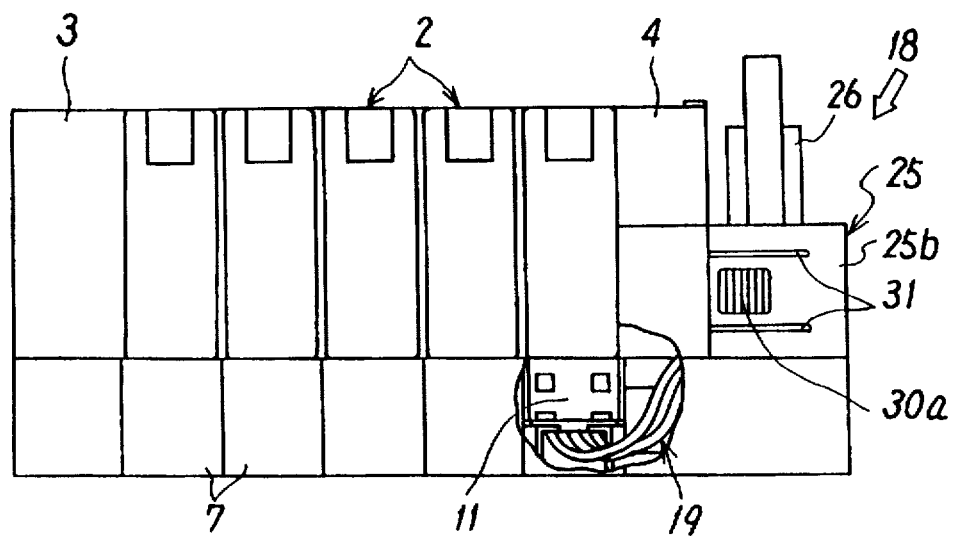
FIG. 4 is a front view of the same embodiment, with a part of FIG. 3 cut open.

As can be seen from FIGS. 1 to 3, the head of the upper fastening bolt 5 is fitted in a recess in the side plate 3, with the middle part thereof passed through recesses 2a, 3a and 4a at the top of the solenoid valve 2 and side plates 3 and 4 and the tip thereof bolted into a nut 8 unrotatably fitted in a recess in the side plate 4.

The lower fastening bolts 6 are passed through holes 9 in the side plate 3 and recesses 2b at the bottom of the solenoid valve 2, with the tips thereof screwed into threaded holes in the side plate 4.

The solenoid valve 2 whose details are shown in FIG. 1 has two electromagnetically actuated change-over valves of know type composed as a five-port valve, one placed on top of the other, in a valve casing. The solenoid valve 2 has a supply duct P and discharge ducts EA and EB that are common to all solenoid valves and output ducts A and B that are independently provided in each change-over valve. The position of a valve body not shown is switched by turning on and off the solenoids 2A to bring the output ducts A and B into communication with the supply duct P and discharge ducts EA and EB.

Gaskets 10 are provided between the mating surfaces of adjoining solenoid valves 2 and those of solenoid valves 2 and the side plates 3 and 4 for sealing to prevent communication between the supply duct P and the discharge ducts EA and EB and between the output ducts A and B of adjoining solenoid valves.

A power receiving terminal 11 to concentrically supply electric power to the solenoids 2A is provided therebelow.

A port block 13 is fastened an end of the solenoid valve 2 opposite to the solenoid 2A by means of fastening bolts, as shown in FIG. 3. The port block 13 have two pairs of output ports (four in number) that individually communicate with the output ducts A and B. Quick-connection type pipe joints 14A and 14B are attached to the output ports. The pipe joints has an engaging means that automatically catches a pipe that is inserted therein. The pipe is released and becomes removable when a release bush is pressed in.

Reference characters 15A and 15B in the figures are manual controllers that permit manual switching of the flow of the hydraulic fluid between the ports of the solenoid valve 2.

A port block 16 is fastened to the first side plate 3 by means of fastening bolts. The port block 16 has a supply port and a discharge port individually communicating with the supply duct P and the discharge ducts EA and EB. The supply and discharge of compressed air to and from the solenoid valve 2 are collectively made through the above-mentioned ports. Quick-connection type pipe joints 14P and 14E are attached to the supply and discharge ports.

The second side plate 4 is for attaching a multipolar connector unit 18. The second side plate 4 has two fitting faces to permit fitting the connector unit 18 either in an upright position or a horizontal position. The two faces are a vertical first fitting surface 21a and a second fitting surface 21b that extends horizontally from the lower end of the first fitting surface 21a.

Two pairs of positioning recesses 22a and 22b to determine the fastening position of the connector unit 18 and two pairs of engaging recesses to secure engage the connector unit 18 in position are symmetrically provided on the first and second fitting surfaces 21a and 21b. An opening 20 to pass a lead wire 19 is provided at the corner where the fitting surfaces 21a and 21b meet so as to extend over the two fitting surfaces between the two pairs of positioning and engaging recesses.

The positioning recesses 22a on the first fitting surface are vertical slots, whereas the positioning recesses 22b on the second fitting surface 21b are outwardly opening recesses at one edge thereof.

Figure 5:
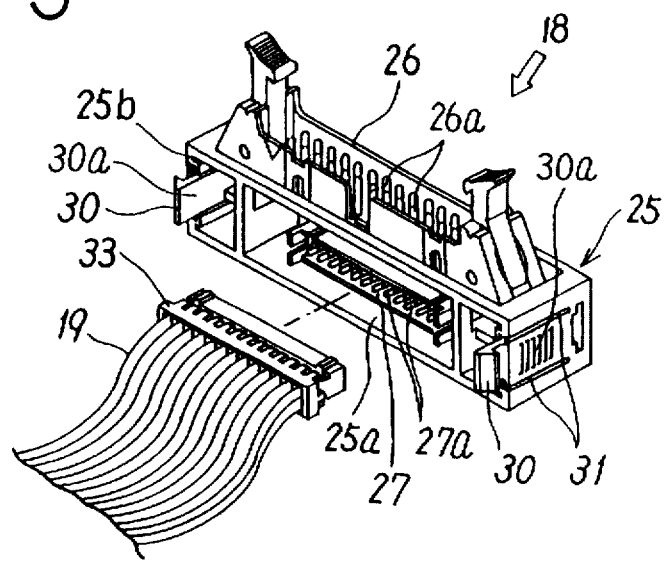
FIG. 5 is a perspective view of the connector unit.
Figure 6:
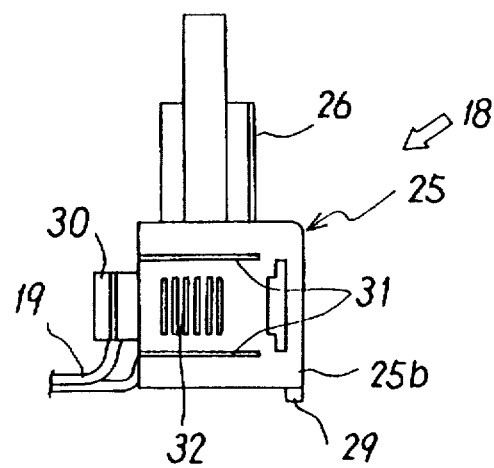
FIG. 6 is a side elevation of the connector unit shown in FIG. 5.

The connector unit 18 comprises a holder 25 that detachably holds a first connector 26 leading from a power supply or a controller to a socket not shown and a second connector 27 connected to the solenoid 2A of each solenoid valve 2 through a socket 33 and the lead wire 19 in two directions 90 degrees apart from each other, as shown in FIGS. 5 and 6. Connecting pins 26a and 27a of the connectors 26 and 27 are electrically connected to each other in the holder 25.

Commercially available connectors can be used as the first and second connectors 26 and 27. The lead wire 19 need not be limited to the flat cable shown.

The holder has a long box-like shape. Two positioning projections 29 are symmetrically provided at one edge of the width of the bottom thereof. The projections 29 are selectively fitted into the positioning recesses 22a or 22b on the fitting surface 21a or 21b. Two fastening hooks 30 projecting in the same direction as the second connector 27 are provided at both ends of the length of the holder 25. The hooks 30 are selectively and elastically engaged with the engaging recesses 23a or 23b on the fitting surface 21a or 21b.

The hooks 30 are formed at the tip of an elastic part 30a that is formed by cutting two notches 31 at both ends of the length of the holder 25. The hooks 30 are adapted to be elastically engaged with the engaging recesses 23a or 23b on the fitting surface 21a or 21b when pressed into them. The hooks 30 are removed from the engaging recesses by elastically deforming the elastic part 30a inwardly from both sides of the holder 25 with fingers.

To prevent the slip of fingers when disengaging the hooks from the engaging recesses, the elastic part 30a has an irregular surface.

The housing 7 attached to the bottom of each solenoid valve 2 has pins 7a on one mating surface and holes 7b to accommodate the pins 7a on the other mating surface, as shown in FIG. 1. The same number of housings 7 as the solenoid valves 2 are joined together by fitting the pins 7a in the holes 7b. The pins 7a and holes 7b of the housings 7 at both ends are connected to the holes 3b and pins 4b on the side plates 3 and 4.

The housing 7 is channel-shaped with an open top. The inside is partitioned by a center wall 7c into a section 35 through which the lead wire 19 is passed and a section 36 to which a power supply terminal 37 is attached. The top of the section 35 to pass the lead wire 19 is covered with an openable cover 38. The power supply terminals 37 are connected to the corresponding lead wires 19 and the power receiving terminal 11 below the solenoid valve 2.

A terminal box 40 is attached to the second side plate 4. The terminal box 40 contains power supply terminals 41 that lead to a power supply, with the top thereof covered with a transparent cover 42. The power supply terminals 41 are electrically connected to the connector 27. Therefore, collective power supply to the solenoid valves 2 can be made through the power supply terminals 41, as well.

Reference numeral 43 in FIG. 1 designates holes provided in the first and second side plates 3 and 4 that are used when fitting the solenoid valve assembly 1 to any desired member.

To attach the connector unit 18 to the second side plate 4 of the solenoid valve assembly 1 in an upright position (see FIGS. 3 and 4), the connector unit 18 is set in a direction indicated by 18A in FIG. 2, in which the first connector 26 is directed upward and the second connector 27 is directed inward. The fastening positions determined by fitting the projections 29 at the bottom of the holder 25 sideways into the positioning recesses 22b on the second fitting surface 21b. The holder 25 is moved sideways toward the first fitting surface 21a, whereupon the hooks 30 are inserted into the engaging recesses 23a on the first fitting surface 21a for elastic engagement.

With the connector unit 18 fitted in position with the first connector 26 directed upward, a socket (not shown) connected to a power supply or a controller can be connected to the first connector 26 from above.

To attach the connector unit 18 in a horizontal position, the connector unit 18 is set in a direction indicated by 18B in FIG. 2, in which the first connector 26 is directed horizontally and the second connector 27 is directed downward. The fastening position is determined by fitting the projections 29 at the bottom of the holder 25 into the positioning recesses 22a on the first fitting surface 21a. The holder 25 is moved downward to insert the hooks 30 into the engaging recesses 23b on the second fitting surface 21b for elastic engagement.

With the connector unit 18 fitted in position with the first connecter 26 directed horizontally, a socket connected to a power supply or a controller can be connected sideways to the first connector 26.

The connector unit 18 attached to the second side plate 4 in an upright or a horizontal position can be detached from the second side plate 4 by disengaging the hooks 30 from the engaging recesses 23a or 23b by elastically deforming the elastic parts 30a inward from both sides with fingers.

Thus, the connector unit 18 can be easily and selectively attached to either of the two fitting surfaces 21a and 21b on the second side plate 4 in an upright or a horizontal position without using any screw. The two each projections and hooks on the holder 25 and the two each positioning and engaging recesses on the fitting surfaces 21a and 21b are all symmetrical with respect to the center. Therefore, the connector unit 18 can be accurately attached in the desired direction by turning back and forth and held in the same position regardless of the direction thereof.

The opening 20 to pass the lead wire is provided so as to extend over the two fitting surfaces 21a and 21b between the two pairs of positioning and engaging recesses. Therefore, the opening 20 can be used regardless of which direction the connector unit 18 is positioned, without the need for covering it. This provides a rational and efficient fitting mechanism that assures easy and secure fitting of the connector unit 18.

Figure 7:
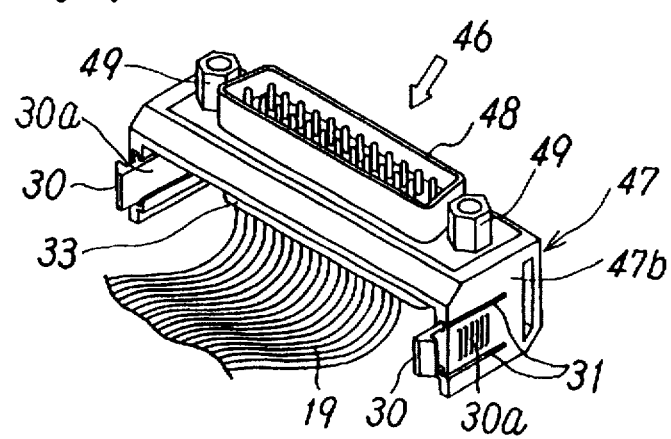
FIG. 7 is a perspective view of the connector unit in a second embodiment of this invention.

FIG. 7 shows a second embodiment of the connector unit according to this invention. A connector unit 46 comprises a holder 47 that holds only a first connector 48 that is fastened thereto by means of fastening screws 49, with a lead wire 19 directly connected to the first connector 48. The second embodiment differs from the first embodiment only slightly. The differences are whether the second connector 27 is present or not, and the designs of the first connectors 26 and 48 and the shapes of the holders 25 and 47. Therefore, the mechanisms for attaching the connector units 18 and 46 are substantially the same.

Hence, similar parts are designated by similar reference characters, without providing detailed description.

As is obvious from the above, this invention permits selectively attaching the connector unit to the two fitting surfaces of the second side plate, either in an upright or a horizontal position, with ease, certainty and accuracy, without using any screws.

The illustrated embodiment have both of the positioning recesses to determine the fastening position of the connector unit and the engaging recesses to fix the connector in position. However, it is not always necessary to provide both of the positioning and engaging recesses. It may suffice to provide at least the engaging recesses alone.

In the illustrated embodiment, the positioning means consist of two each positioning recesses and projections, whereas the engaging means consist of two each engaging recesses and hooks. Instead, one each positioning recess, projection, engaging recess and hook may suffice. Then, it is preferable to provide all of the positioning recess, projection, engaging recess and hook at the center of the individual fitting surfaces.

This invention is applicable not only to the illustrated solenoid valves having two change-over valves and common ducts passing through the individual valves but also to many other types of common solenoid valves.

What is claimed is:

1. In means for attaching a connector unit supplying power to individual solenoid valves to a solenoid valve assembly comprising multiple solenoid valves, the improvement which comprises:

a side plate disposed at one end of the solenoid valve assembly having a vertical first fitting surface and a second fitting surface extending horizontally from the first fitting surface for fastening the connector unit, an opening to pass a lead wire extending over the two fitting surfaces, and at least one engaging recess provided in each of the two fitting surfaces to fasten the connector unit in position; and the connector unit having at least one hook adapted to be selectively and elastically engaged with the engaging recesses on each fitting surface to permit selective fastening of the connector unit in an upright or a horizontal position.

2. The improvement according to claim 1, in which at least one positioning recess to determine the fastening position of the connector unit is provided in each of the two fitting surfaces of the side plate and at least one projection to engage with the positioning recess is provided on the connector unit.

3. The improvement according to claim 1 or 2, in which the connector unit comprises a first connector leading to the individual solenoid valves and a holder to hold the first connector, with the holder having said hook or both of said hook and projection.

4. The improvement according to claim 2, in which two each positioning and engaging recesses are symmetrically provided on each of the two fitting surfaces of the side plate and two each projections and hooks are symmetrically provided on the connector unit.

5. The improvement according to claim 4, in which the connector unit has a first connector leading to the individual solenoid valves and a holder to hold the first connector, with the holder having said two each projections and hooks.

6. The improvement according to claim 5, in which the holder is shaped like a long box with an open top and side, with the first connector mounted on the top thereof, the lead wires from the individual solenoid valves connected to the first connector through the open side, two projections formed at the bottom of the holder, and said hooks are provided on the elastic part formed at both ends of the length of the holder.

* * * * *